April 27, 1943.   T. R. SCOTT   2,317,488
ELECTRIC POWER CABLE
Filed Feb. 28, 1940   4 Sheets-Sheet 1
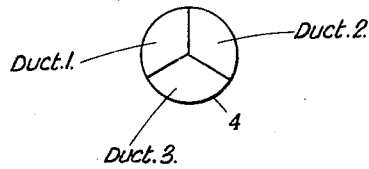
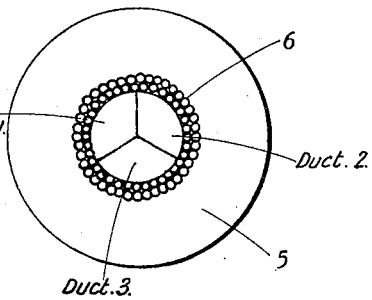
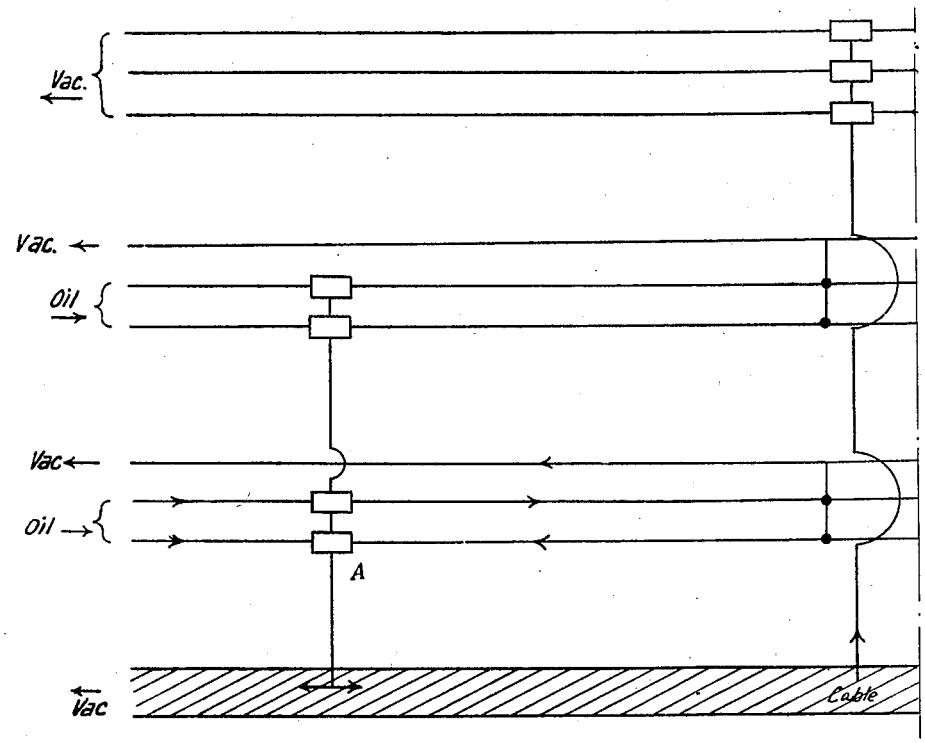

April 27, 1943.  T. R. SCOTT  2,317,488
ELECTRIC POWER CABLE
Filed Feb. 28, 1940  4 Sheets-Sheet 2

Inventor
T. R. Scott
by R C Hopgood
Attorney

Inventor
J. R. Scott
by R C Hoogood
Attorney

April 27, 1943.    T. R. SCOTT    2,317,488
ELECTRIC POWER CABLE
Filed Feb. 28, 1940    4 Sheets-Sheet 4
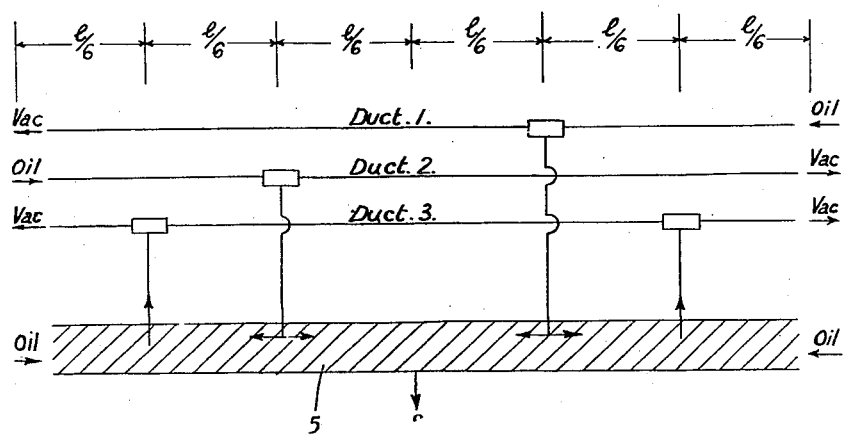
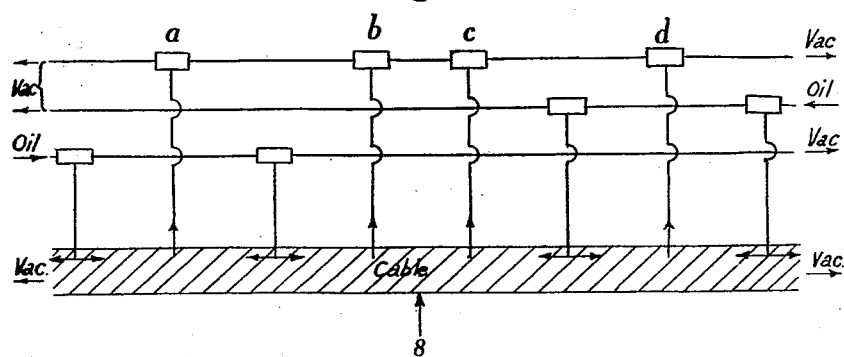
Inventor
T. R. Scott
by R. C. Hopgood
Attorney Patented Apr. 27, 1943

2,317,488

UNITED STATES PATENT OFFICE 2,317,488

ELECTRIC POWER CABLE

Thomas Robertson Scott, London, England, assignor to International Standard Electric Corporation, New York, N. Y.

Application February 28, 1940, Serial No. 321,250
In Great Britain March 14, 1939

4 Claims. (Cl. 154—2.23)

This invention relates to electric power cables and more specifically to a method of impregnating the cable insulation with cable compound.

It has been proposed in Patent No. 2,063,346 to reduce the effective length of cables (and thereby the fluid resistance) during impregnation (after sheathing) by tapping the lead sheath at various points and inserting nipples. The nipples are connected by pipes to the vacuum and oil systems. As the length of the cable is increased and the number of nipples becomes large, certain difficulties are experienced both in respect of the multiplicity of pipe lines and also in respect of the access to the coils of cable on the reel or drum. It would be convenient to reduce the number of nipples to a minimum and this can be effected as described below by the provision of special ducts within the cable.

It should be noted that modern cable practice tends to increase the fluid resistance of cables since there is a tendency to "compact" the strand of the conductor to save space, and there is also a tendency to compress the lead sheath on to the insulation in order to reduce drainage or migration of compound.

These ducts may be in the form of flexible tubes of thermo-plastic compound, e. g. oil resisting material, with or without internal divisions or supporting members. They may be inserted in the cable structure in convenient places, e. g filler spaces or in the centre of the conductor. In the latter position they may be used to increase the conductor diameter in order to reduce the maximum electrical stress arising from the applied voltage.

Fig. 1 is an end view of a flexible tube divided into three ducts;

Fig. 2 is an end view of a single core cable provided with a flexible tube like the one shown in Fig. 1;

Figs. 6, 7 and 8 are alternatives of Fig. 5; and

Figure 9A:
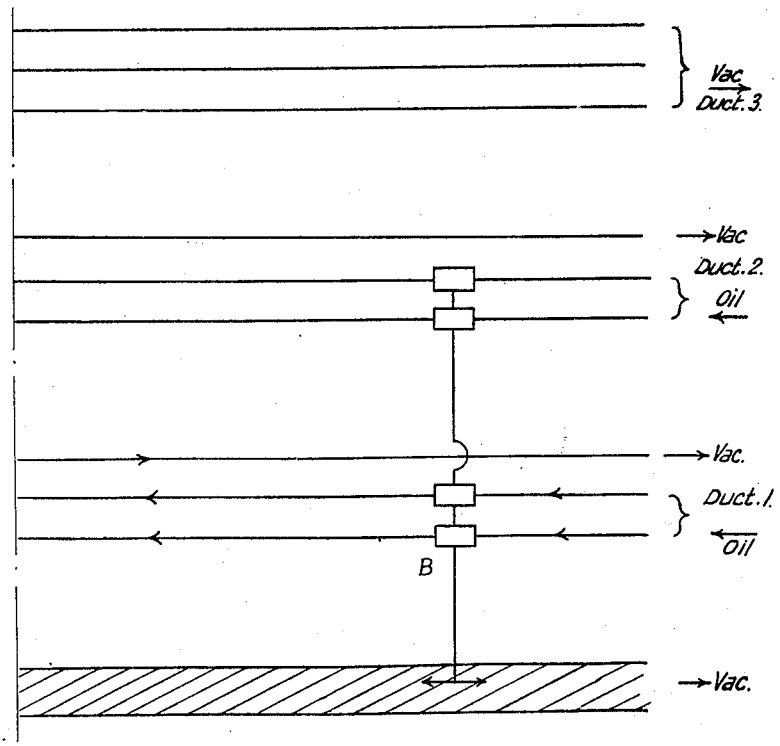

Figs. 9 and 9a when placed side-by-side diagrammatically represent the blocking of cable ducts.

Figure 3:
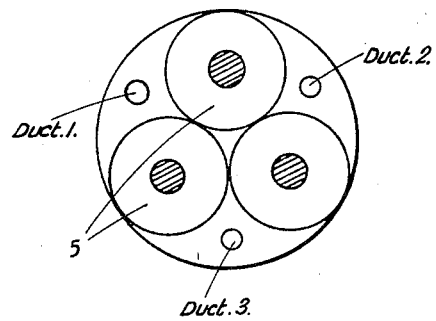
Fig. 3 is an end view of a three core cable provided with ducts in the wormings.

Now referring to the accompanying drawings each flexible tube 4 may comprise one or more ducts, for example, if a plurality of ducts are contained in one tube sub-divisions may be formed as shown in Fig. 1, in which the tube 4 is divided into three ducts 1, 2, 3. Such a duct is shown in Fig. 2 as the central member of a conductor 6 of a single core cable 5. Fig. 3 shows single duct tubes 1, 2, 3 inserted in the wormings or filler spaces of a 3-core cable 5.

For convenience a 3-duct system is dealt with below, but it should be understood that any number of ducts may be employed, the impregnating system being modified accordingly.

Figure 4:
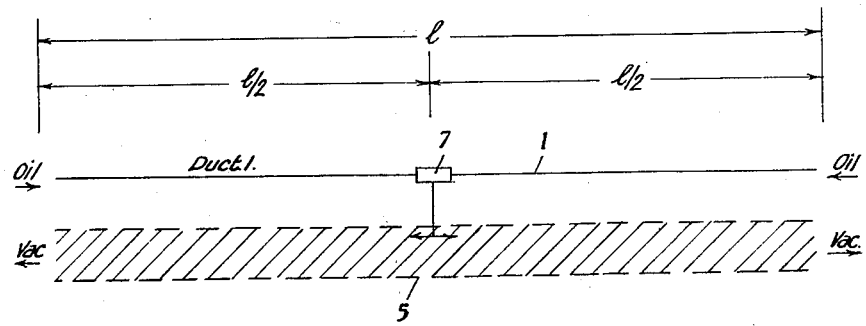
Fig. 4 is a diagrammatic representation of the impregnation of one duct of a cable.

In the aforesaid patent it is shown that as the effective length for impregnation is reduced the time required for impregnation is greatly reduced, e. g. if a nipple be inserted at the central point of a cable length the length $l$ is reduced to $l/2$ and the time of impregnation $t$ (from end to end of the cable) is reduced to $t/4$. The insertion in accordance with this invention of one duct 1 cut open at 7 at the centre of the cable length 5 would achieve the same result (see Fig. 4).

It will be understood that the drawings are diagrammatic and that the ducts are shown outside the cable 5 in the drawings in order to show clearly the hydraulic circuit involved in each construction.

The duct 1 is in effect the external pipe-line of the aforesaid patent, which would be connected to the nipple at the centre of the cable in the aforesaid patent, whereas according to this invention the duct 1 is applied internally in the cable structure 5, the break in the duct 1 being equivalent to the nipple in the aforesaid patent.

Figure 5:
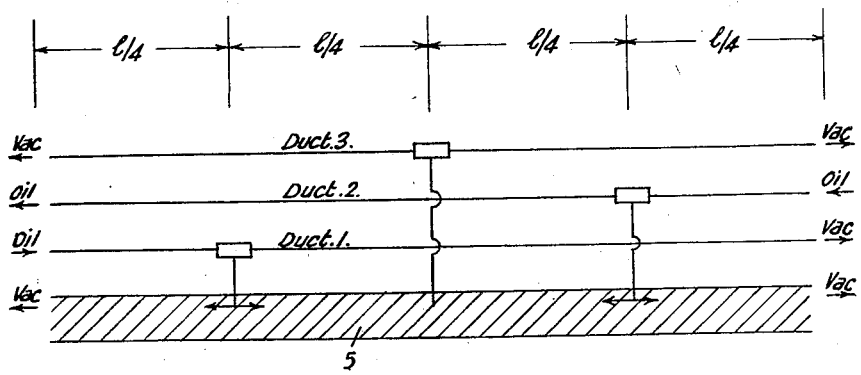
Fig. 5 is a diagrammatic representation of the impregnation of a cable having a three-duct system.
Figure 6:
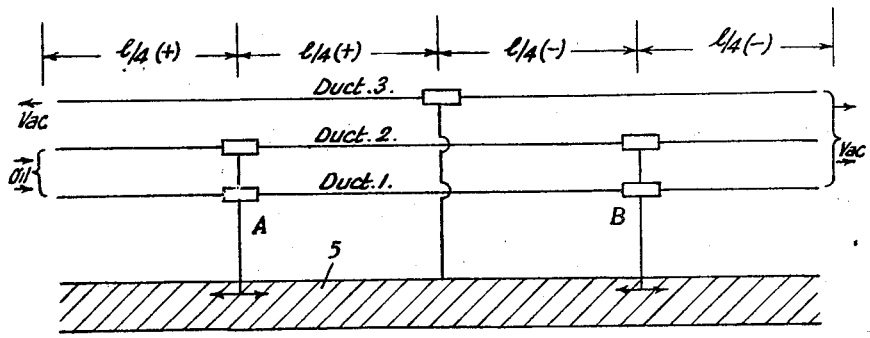

Fig. 5 shows a 3-duct system which reduces the effective length of the cable to $l/4$. The same result could, for example, be obtained by eliminating duct 3 and substituting a nipple at the midpoint of the cable. It should be noted that ducts 1 and 2 may be cut open at the same places in the cable so that they both supply oil in "parallel" as in Fig. 6. This system can be used when the fluid resistance of the duct is low compared with that of the cable. To co-ordinate flow times the lengths $l/4$ may be adjusted (+) and (−) (i. e. certain of the lengths marked + may be increased and the other lengths decreased) as shown in Fig. 6 to compensate for the duct resistance between A and B.

If one nipple 8 placed under vacuum is employed together with 3 ducts the arrangement shown in Fig. 7 may be effected; the effective length of the cable being reduced to $l/6$. As before ducts 1 and 2 may be cut at the same spot and put in parallel in a manner similar to Fig. 6. Another arrangement is shown in Fig. 8 in which the effective length is reduced to $l/10$. In such a case, however, it is preferable to make the sections of such length that, e. g. oil reaches a first, b second, c third, d last, or some other arrangement which prevents shutting off from the vacuum system. In the arrangement shown in Fig. 8, the nipple 8 is an oil nipple.

As can be seen from the above, the variety of systems can be produced from three ducts, in conjunction with, if desired, one or two nipples. An even greater variety can be obtained by utilising 6 or 9 ducts. A system of nine ducts can be obtained for example, by inserting 3 tubes (similar to Fig. 1) each containing 3 ducts, in the filler spaces of a 3-core cable.

When the cable is completely impregnated and has been cooled to atmospheric temperature with oil pressure applied to each of the ducts, it will be desirable in the case of "solid type" cables to block up the ducts so that migration of compound under service conditions is inhibited. For this purpose prior to the completion of cooling of the cable under pressure the type of compound pumped into the ducts may be changed from that used for impregnating the cable to one which is plastic or solid at all operating temperatures in service. For example, the new "blocking" compound fed into the ducts may comprise monomeric or partially polymerised styrene (containing preferably an accelerator to promote rapid progress in polymerisation) with or without a plasticiser such as resin and/or resin oil.

It should be noted that all that is necessary is to plug the ends of the ducts or, for convenience the ducts over a sufficiently long section to permit of cutting back of the cable for testing and for jointing. If for any reason the cable is later cut at a point in its length it is only necessary to plug the cut ends of the ducts mechanically, e. g. by injecting under pressure, heat softened polystyrene.

If a more widespread blocking of the ducts is required, the system shown in Fig. 9 may be used and "blocking" compound may be pumped into the ducts 1 and 2 via the vacuum channel of each of these ducts so that it enters the oil channels at the mid-point of such a channel and proceeds therefrom towards A and B. It will of course be understood that in the drawings the reference VAC indicates that the pressure within the duct is reduced by connection to a suitable vacuum pump or the like while the reference OIL indicates that compound is fed into the duct.

The flexible tubes comprising the ducts and channels are preferably of an oil-resisting material or one which is slowly attacked by oil or by the "blocking" compound. It may be convenient to have the ducts slowly attacked and swollen so that the tube is finally reduced to a rod of swollen plastic material. Materials proposed for the ducts are polyvinyl chloride usually known in the trade as "mipolam," styrene in combination with rubber and/or polyisobutylene.

It will be appreciated therefore, that the invention provides a method of impregnating the insulation of a power cable comprising providing a duct or ducts extending longitudinally within the cable, the said duct or ducts being cut open at a convenient point or points along the length of the cable and thereafter feeding compound into the duct or ducts in order to effect impregnation of the cable. When impregnation has been completed the duct or ducts may be blocked wholly or at the ends by feeding in thermoplastic or polymerisable insulating material adapted to turn solid within the duct or ducts. The invention also includes a power cable provided internally thereof with a longitudinally-extending duct or ducts cut open at a convenient point or points along the length of the cable to facilitate impregnation of the insulation. Finally, it will be understood that preferably the ducts are so arranged that compound is only permitted to pass into the insulation at the specified points at which the tubes are cut or provided with orifices.

What is claimed is:

1. Method of manufacturing and impregnating an electric cable of the solid type which comprises providing within the outer sheath of said cable insulation an impermeable duct means formed of insulating material provided with predetermined longitudinally spaced openings, and impregnating said insulation by injecting oil into said duct means under pressure whereby oil is forced out from said openings to impregnate the insulation adjacent to, and between said openings, and thereafter injecting into said ducts an insulating compound which slowly dissolves the walls of said duct means and forms a barrier there.

2. In an electric cable having insulation an impermeable duct means provided with predeterminedly longitudinally spaced openings, the method of insulating said cable which comprises injecting oil into said duct means under pressure whereby oil is forced out from said openings to impregnate the insulation adjacent to, and between said openings, and thereafter, injecting into said ducts a blocking compound of insulating material effective to block the duct against the passage of oil.

3. In an electric cable of the solid type having insulation an impermeable duct means formed of polyvinyl chloride provided with predetermined longitudinally spaced openings, the method of insulating said cable which comprises impregnating said insulation by insulating fluid forced out from said openings in said duct means, and thereafter converting said duct means into a rod of plastic material by injecting into said duct means a blocking compound which slowly attacks the walls of said duct means and combines therewith.

4. In an electric cable of the solid type having insulation an impermeable duct means formed of insulating material provided with openings disposed therein in predetermined longitudinal sections of the cable, the method of insulating said cable which comprises impregnating said cable sections by oil forced from said openings and thereafter causing said duct means to swell by filling said means with a blocking compound which combines with the material forming said ducts thereby converting said duct means into a solid body.

THOMAS ROBERTSON SCOTT.